US012101322B2

(12) United States Patent
Burton

(10) Patent No.: US 12,101,322 B2
(45) Date of Patent: *Sep. 24, 2024

(54) SMART WHITELISTING FOR DNS SECURITY

(71) Applicant: Infoblox Inc., Santa Clara, CA (US)

(72) Inventor: Renee Carol Burton, Sykesville, MD (US)

(73) Assignee: Infoblox Inc., Santa Clara, CA (US)

( * ) Notice: Subject to any disclaimer, the term of this patent is extended or adjusted under 35 U.S.C. 154(b) by 104 days.

This patent is subject to a terminal disclaimer.

(21) Appl. No.: 17/520,394

(22) Filed: Nov. 5, 2021

(65) Prior Publication Data

US 2022/0060477 A1 Feb. 24, 2022

Related U.S. Application Data

(63) Continuation of application No. 16/399,252, filed on Apr. 30, 2019, now Pat. No. 11,206,265.

(51) Int. Cl.
*H04L 29/06* (2006.01)
*H04L 9/40* (2022.01)
(Continued)

(52) U.S. Cl.
CPC ............ *H04L 63/101* (2013.01); *H04L 47/70* (2013.01); *H04L 61/4511* (2022.05);
(Continued)

(58) Field of Classification Search
CPC ... H04L 63/101; H04L 61/4511; H04L 47/70; H04L 63/145; H04L 63/1466;
(Continued)

(56) References Cited

U.S. PATENT DOCUMENTS 5,395,603 A 3/1995 Hilakos
8,572,680 B2 10/2013 Osterweil
(Continued)

FOREIGN PATENT DOCUMENTS

CN 103957285 9/2015
CN 106060067 12/2018
(Continued)

OTHER PUBLICATIONS

Sun et al., Research on Massive APT Communication Log Characteristic Based on LDA Model, Computer Engineering, 02, Feb. 15, 2017.
(Continued)

*Primary Examiner* — Muhammad Raza
(74) *Attorney, Agent, or Firm* — Van Pelt, Yi & James LLP

(57) ABSTRACT

Techniques for smart whitelisting for Domain Name System (DNS) security are provided. In some embodiments, a system/process/computer program product for smart whitelisting for DNS security in accordance with some embodiments includes receiving a set of network related event data, wherein the set of network related event data includes Domain Name System (DNS) related event data; receiving a set of network related threat data, wherein the set of network related threat data includes DNS related threat data; and generating a whitelist using the set of network related event data and the set of network related threat data, wherein the whitelist includes a subset of network domains included in the DNS related event data based on a data driven model of the DNS related event data and the DNS related threat data.

18 Claims, 9 Drawing Sheets

(51) Int. Cl.
  *H04L 12/911* (2013.01)
  *H04L 29/12* (2006.01)
  *H04L 47/70* (2022.01)
  *H04L 61/4511* (2022.01)
(52) U.S. Cl.
  CPC ...... *H04L 63/0227* (2013.01); *H04L 63/1425* (2013.01); *H04L 63/145* (2013.01); *H04L 63/1466* (2013.01); *H04L 63/1483* (2013.01)
(58) Field of Classification Search
  CPC ............. H04L 63/1483; H04L 63/1425; H04L 63/0227; H04L 63/1441; H04L 61/302
  See application file for complete search history.

(56) References Cited

U.S. PATENT DOCUMENTS

| | | | |
|---|---|---|---|
| 8,910,280 | B2 | 12/2014 | Karasaridis |
| 9,043,894 | B1 | 5/2015 | Dennison |
| 9,185,127 | B2 | 11/2015 | Neou |
| 9,300,623 | B1 | 3/2016 | Earl |
| 9,363,282 | B1 | 6/2016 | Yu |
| 10,362,057 | B1* | 7/2019 | Wu ................... H04L 63/1408 |
| 10,474,820 | B2 | 11/2019 | Manadhata |
| 10,560,423 | B1* | 2/2020 | Rodriguez ............. H04L 67/02 |
| 2002/0073157 | A1 | 6/2002 | Newman |
| 2004/0049490 | A1 | 3/2004 | Milov |
| 2004/0267893 | A1 | 12/2004 | Lin |
| 2005/0015626 | A1 | 1/2005 | Chasin |
| 2006/0165060 | A1 | 7/2006 | Dua |
| 2006/0265489 | A1 | 11/2006 | Moore |
| 2008/0082662 | A1 | 4/2008 | Dandliker |
| 2009/0158430 | A1 | 6/2009 | Borders |
| 2011/0314152 | A1 | 12/2011 | Loder |
| 2012/0198549 | A1 | 8/2012 | Antonakakis |
| 2013/0014253 | A1 | 1/2013 | Neou |
| 2013/0031625 | A1 | 1/2013 | Lim |
| 2014/0007238 | A1 | 1/2014 | Magee |
| 2014/0298460 | A1* | 10/2014 | Xue ................... H04L 63/1425 726/23 |
| 2014/0344452 | A1 | 11/2014 | Lipstone |
| 2015/0007312 | A1* | 1/2015 | Pidathala ............ H04L 63/1433 726/22 |
| 2015/0195299 | A1 | 7/2015 | Zoldi |
| 2015/0350229 | A1 | 12/2015 | Mitchell |
| 2015/0373043 | A1 | 12/2015 | Wang |
| 2016/0006693 | A1* | 1/2016 | Salcedo ............. H04L 63/0414 726/1 |
| 2016/0006749 | A1 | 1/2016 | Cohen |
| 2016/0012223 | A1 | 1/2016 | Srivastava |
| 2016/0014147 | A1 | 1/2016 | Zoldi |
| 2016/0057167 | A1 | 2/2016 | Bach |
| 2016/0261608 | A1* | 9/2016 | Hu ......................... H04L 63/10 |
| 2016/0285894 | A1 | 9/2016 | Nelms |
| 2016/0294773 | A1* | 10/2016 | Yu ...................... H04L 63/1425 |
| 2016/0315856 | A1 | 10/2016 | Tewari |
| 2016/0359887 | A1 | 12/2016 | Yadav |
| 2016/0381049 | A1 | 12/2016 | Lakhani |
| 2016/0381065 | A1 | 12/2016 | Xie |
| 2017/0026390 | A1* | 1/2017 | Sofka .................. H04L 63/1416 |
| 2017/0063903 | A1 | 3/2017 | Muddu |
| 2017/0118167 | A1* | 4/2017 | Subramanya ......... H04L 63/101 |
| 2017/0142144 | A1 | 5/2017 | Weinberger |
| 2017/0180378 | A1 | 6/2017 | Tyler |
| 2017/0323102 | A1* | 11/2017 | Manadhata ............. G06F 21/57 |
| 2017/0374084 | A1 | 12/2017 | Inoue |
| 2018/0004948 | A1 | 1/2018 | Martin |
| 2018/0020002 | A1 | 1/2018 | Duca |
| 2018/0039486 | A1 | 2/2018 | Kulkarni |
| 2018/0063190 | A1 | 3/2018 | Wright |
| 2018/0115582 | A1 | 4/2018 | Thakar |
| 2018/0139229 | A1 | 5/2018 | Osterweil |
| 2018/0152468 | A1 | 5/2018 | Nor |
| 2018/0176232 | A1 | 6/2018 | Rodriguez |
| 2018/0176243 | A1 | 6/2018 | Arnaldo |
| 2018/0234445 | A1 | 8/2018 | Bhatt |
| 2018/0343272 | A1 | 11/2018 | Khalil |
| 2018/0343277 | A1 | 11/2018 | Drihem |
| 2019/0036930 | A1* | 1/2019 | Bartik ................... G06F 21/577 |
| 2019/0056722 | A1 | 2/2019 | Abbaszadeh |
| 2019/0098032 | A1 | 3/2019 | Murphey |
| 2019/0132344 | A1* | 5/2019 | Lem ........................ G06N 20/00 |
| 2019/0238538 | A1* | 8/2019 | Shaw .................. H04L 63/0227 |
| 2019/0312846 | A1 | 10/2019 | Taylor |
| 2019/0387005 | A1 | 12/2019 | Zawoad |
| 2020/0007548 | A1 | 1/2020 | Sanghavi |
| 2020/0067970 | A1 | 2/2020 | Compton |
| 2020/0128038 | A1 | 4/2020 | Neystadt |
| 2020/0287913 | A1 | 9/2020 | Buck |
| 2020/0351270 | A1* | 11/2020 | Burton ................ H04L 63/1466 |
| 2021/0203671 | A1 | 7/2021 | Baldwin |
| 2021/0209512 | A1* | 7/2021 | Gaddam ............. H04L 63/1408 |

FOREIGN PATENT DOCUMENTS

| | | |
|---|---|---|
| EP | 3151511 | 5/2019 |
| WO | 20150195093 | 12/2015 |

OTHER PUBLICATIONS

Ameya Dusane, Taykey Launches Smart Whitelist for Quality Optimization and Engagement, Oct. 5, 2017.

Antonakakis et al., "Building a Dynamic Reputation System for DNS", Proceedings of the 19th USENIX Conference on Security, 2010.

Antonakakis et al., "Detecting Malware Domains at the Upper DNS Hierarchy", Proceedings of the 20th USENIX Conference on Security, 2011.

Atkins et al., RFC 3833—Threat Analysis of the Domain Name System (DNS), Threat Analysis of the Domain Name System (DNS), Network Working Group, Aug. 2004.

Bilge et al., Exposure: Finding Malicious Domains Using Passive DNS Analysis, Conference: Proceedings of the Network and Distributed System Security Symposium, NDSS, Jan. 2011, pp. 1-17.

Blige et al., Exposure: A Passive DNS Analysis Service to Detect and Report Malicious Domains, 2014.

Burton et al., Whitelists that Work: Creating Defensible Dynamic Whitelists with Statistical Learning, Nov. 2019.

Caglayan et al., Behavioral Analysis of Botnets for Threat Intelligence, 2011.

Chin et al., A Machine Learning Framework for Studying Domain Generation Algorithm (DGA) Based Malware, 2018.

Dai et al., DNSSEC Misconfigurations in Popular Domains, 2016.

Demertzis et al., Evolving Smart URL Filter in a Zone-Based Policy Firewall for Detecting Algorithmically Generated Malicious Domains, 2015.

Dietrich et al., On Botnets That Use DNS for Command and Control, 2011 Seventh European Conference on Computer Network Defense, 2011, pp. 9-16.

DNS-OARC, Domain Name System Operations Analysis and Research Center, 2008.

Domcop, Buy Expired Domains with Great Backlinks, Apr. 18, 2019, retrieved from: https://www.domcop.com.

Farsight Security, Real-Time Contextual Information to Increase the Value of Your Threat Data, Apr. 18, 2019, retrieved from: https://www.farsightsecurity.com.

Gong et al., A Reliability Comparison Method for OSINT Validity Analysis, 2018.

Hesselman et al., Increasing DNS Security and Stability through a Control Plane for Top-Level Domain Operators (paper postprint), 2016.

IBM, Data Driven Modeling, 2021.

Infoblox, Active Trust Cloud, DDI (Secure DNS, DHCP, and IPAM), Apr. 18, 2019, retrieved from: https://www.infoblox.com/products/activetrust-cloud/.

Infoblox, Active Trust Cloud, downloaded Apr. 18, 2019.

Infoblox, Infoblox Threat Intelligence Data Exchange (TIDE) for Active Trust Suite, downloaded Apr. 18, 2019.

(56) References Cited

OTHER PUBLICATIONS

Infoblox, Product Evaluation, Infoblox DNS, DHCP and IP Address Management (DDI) Evaluations, 2021.
J. Levine, Internet Research Task Force (IRTF), DNS Blacklists and Whitelists, Feb. 2010.
J. Levine, RFC 5782—DNS Blacklists and Whitelists, DNS Blacklists and Whitelists, Internet Research Task Force (IRTF), Feb. 2010.
Keim et al., Cyber Threat Intelligence Framework using Advanced Malware Forensics, 2019.
Kountouras et al., Enabling Network Security Through Active DNS Datasets, 2016.
Kristoff, Building an Internet Security Feeds Services, 2018.
Lai et al., Detection of DNS Tunneling by Feature-Free Mechanism, 2018.
Li et al., A Machine Learning Framework for Domain Generation Algorithm-Based Malware Detection, 2019.
Majestic, The Majestic Million, Apr. 18, 2019, retrieved from: https://majestic.com/reports/majestic-million.
Marrison, Understanding the Threats to DNS and how to Secure It, 2015.
Mavroeidis et al., Data-Driven Threat Hunting using Sysmon, 2018.
Mohammad et al., Predicting Phishing Websites using Neural Network Trained with Back-Propagation, 2013.
Murphy, No Place to Hide as DNS comes under Attack, 2016.
Pastrana et al., A First Look at the Crypto-Mining Malware Ecosystem: A Decade of Unrestricted Wealth, 2019.
Pierre Lison, NR Norsk Regnesentral, Norwegian Computing Center, Data-Driven Model of Reputation in Cyber-Security, Second Workshop on Text Analytics for Cybersecurity and Online Safety (TA-COS), 11th International Conference on Language Resources and Evaluation (LREC 2018), Dec. 5, 2018.
Romero-Gomez et al., Towards Designing Effective Visualizations for DNS-based Network Threat Analysis, 2017.
Sapienza et al., Early Warnings of Cyber Threats in Online Discussions, 2017.
Susan Wenograd, Taykey Launches Smart Whitelist that Plugs into DSPs for Brand-Safe Ad Targeting, Oct. 5, 2017.
USU Instructure, Data Driven Models and Marching Learning, usu.inctructure.com, 2020.
Vinayakumar et al., Scalable Framework for Cyber Threat Situational Awareness Based on Domain Name Systems Data Analysis, Chapter, May 2018, pp. 113-142.
Wang et al., BotMeter: Charting DGA-Botnet Landscapes in Large Networks, 2016.
Wikipedia, Data Driven, 2021.
Wikipedia, Threat (computer), 2021.
Wikipedia, Whitelisting, 2021.
Zhauniarovich et al., A Survey on Malicious Domains Detection through DNS Data Analysis, 2018.

\* cited by examiner

SMART WHITELISTING FOR DNS SECURITY

CROSS REFERENCE TO OTHER APPLICATIONS

This application is a continuation of U.S. patent application Ser. No. 16/399,252 entitled SMART WHITELISTING FOR DNS SECURITY filed Apr. 30, 2019, which is incorporated herein by reference for all purposes

BACKGROUND OF THE INVENTION

Domain Name System network services are generally ubiquitous in IP-based networks. Generally, a client (e.g., a computing device) attempts to connect to a server(s) over the Internet by using web addresses (e.g., Uniform Resource Locators (URLs) including domain names or fully qualified domain names). Web addresses are translated into IP addresses. The Domain Name System (DNS) is responsible for performing this translation from web addresses into IP addresses. Specifically, requests including web addresses are sent to DNS servers that reply with corresponding IP addresses or with an error message in case the domain has not been registered, a non-existent domain (e.g., an NX Domain response, also referred to herein as an NXDOMAIN response, is returned by DNS servers for a non-existent domain).

BRIEF DESCRIPTION OF THE DRAWINGS

Various embodiments of the invention are disclosed in the following detailed description and the accompanying drawings.

DETAILED DESCRIPTION

Figure 1:
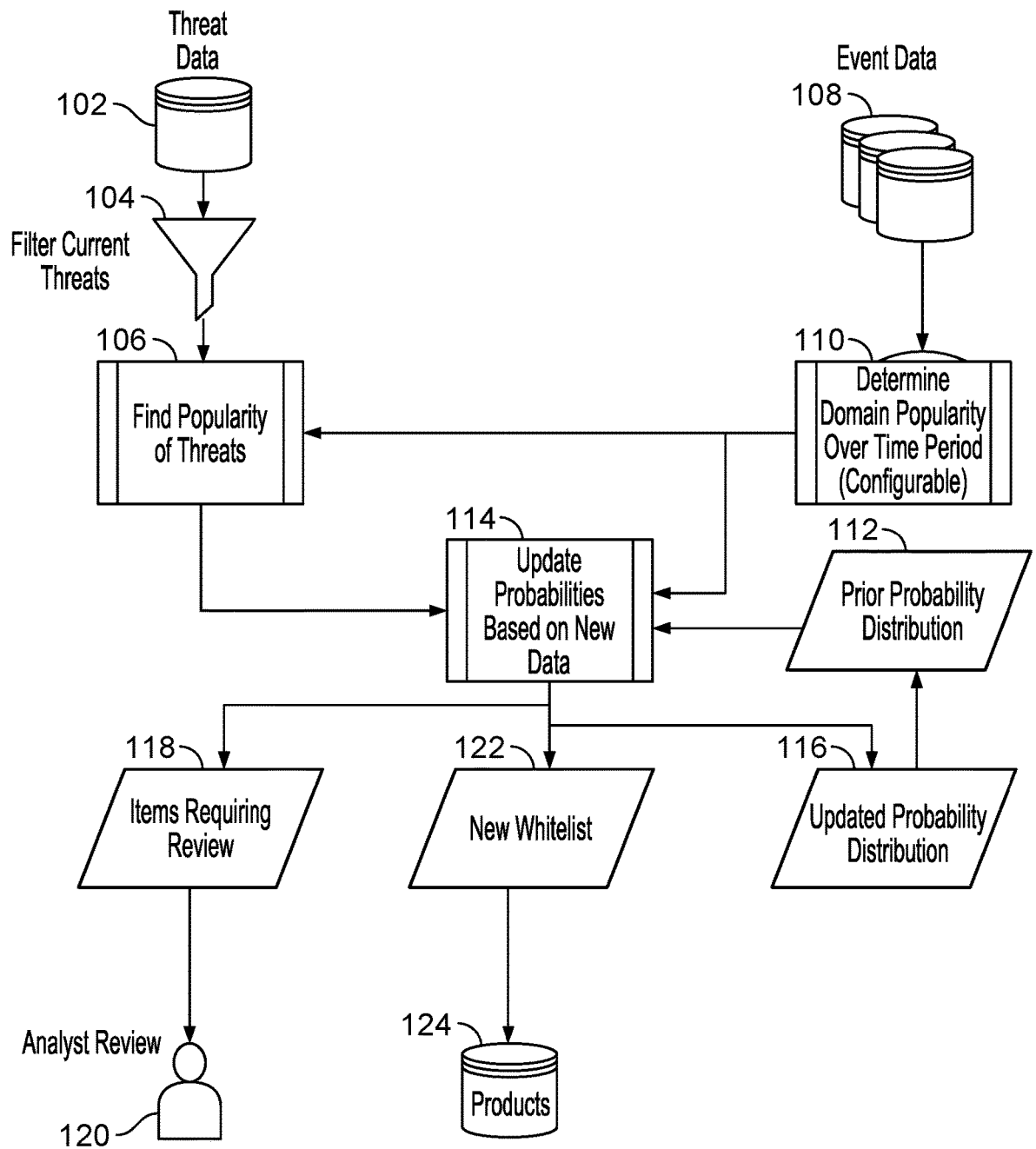
FIG. 1 is a diagram of a system architecture for smart whitelisting for Domain Name System (DNS) security in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Domain Name System network services are generally ubiquitous in IP-based networks. Generally, a client (e.g., a computing device) attempts to connect to a server(s) over the Internet by using web addresses (e.g., Uniform Resource Locators (URLs) including domain names or fully qualified domain names). Web addresses are translated into IP addresses. The Domain Name System (DNS) is responsible for performing this translation from web addresses into IP addresses. Specifically, requests including web addresses are sent to DNS servers that reply with corresponding IP addresses or with an error message in case the domain has not been registered, a non-existent domain (e.g., an NX Domain response, also referred to herein as an NXDOMAIN response, is returned by DNS servers for a non-existent domain).

A blacklist (e.g., also referred to as a block list) generally refers to an access control mechanism that can be applied to, for example, URLs, domain names, IP addresses, and/or other names/addresses (e.g., email addresses, file names, etc.) to deny access to any such objects included on the blacklist. A whitelist (e.g., also referred to as an allow list) refers to an access control mechanism that can be applied, for example, to URLs, domain names, IP addresses, and/or other names/addresses (e.g., email addresses, file names, etc.) to allow access to any objects included on the whitelist.

For example, a URL or domain name that is included on a blacklist can be applied by a DNS server and/or a web browser to deny access to a user's web browsing request to access that URL or domain name. As another example, a URL or domain name that is included on a whitelist can be applied by a DNS server and/or a web browser to allow access to a user's web browsing request to access that URL or domain name.

A blacklist and/or whitelist can be applied to provide enhanced access control and network security, such as for an enterprise network and/or home network. For example, blacklists and/or whitelists can be applied at a DNS server, firewall, email server, and/or another element in a network and/or host/endpoint device. For example, a DNS server can be configured to enforce a blacklist and/or whitelist that includes one or more web addresses (e.g., URLs including domain names and/or FQDNs), such as to block users from accessing malware websites or other unauthorized websites (e.g., alcohol, gambling, and/or other types of sites, based on a configured network/security policy for an enterprise network) or to allow users to access authorized websites (e.g., internal, preapproved, and/or other types of authorized sites, based on a configured network/security policy for an enterprise network), respectively.

Blacklisting implementations, including those found in commercially available DNS security products, are generally prone to errors from humans as well as from automation. Whitelists are commonly used as a preventative measure to minimize the impact of such errors, but whitelists are technically challenging and time consuming to create and manage in the constantly evolving website and Internet environment.

For example, whitelists are often stale and include irrelevant, or overly broad, items. A whitelist is also preferably a short list (e.g., a relatively short list of domains, which is not overly inclusive of potentially undesired, greyware, and/or malware domains while minimizing the impact of errors in a blacklist on a customer's production data environment.

Existing approaches to whitelists are generally based on a manual list creation process, which is a time consuming and error prone process. Existing approaches to whitelists may also use manually curated lists based on false positives found in threat indicator lists, which generally leads to stale and questionable entries that are not context-aware and cause an inflation in the size of the whitelist. For example, a domain that was found to be benign may later be purchased by a malicious actor. Another common approach to whitelists is to use publicly available lists, such as the Alexa top one hundred thousand list of websites available at https://www.alexa.com/siteinfo/100k.to, Majestic Million available at https://majestic.com/reports/majestic-million, DomCop available at https://www.domcop.com/, or other commercially/publicly available lists of top visited websites, for creating whitelists. However, this is a dangerous approach, because these lists are known to occasionally include malicious domains (e.g., malware domains) and, in addition, they are generated from a perspective that may not properly model the data production environment. In some existing approaches, the popularity of domains within a customer network is considered, but without regard to threats in the environment. As such, existing approaches generally create whitelists that are typically either too small and ineffective or too large and insecure (e.g., by including domains that should not be whitelisted, such as by including a malware domain and/or a domain that should not be whitelisted for a particular data production environment).

Overview of Techniques for Smart Whitelisting for DNS Security

As such, new and improved techniques for smart whitelisting for Domain Name System (DNS) security are provided. In some embodiments, a system/process/computer program product for smart whitelisting for DNS security in accordance with some embodiments includes receiving a set of network related event data (e.g., a set of popular network domains), wherein the set of network related event data includes Domain Name System (DNS) related event data; receiving a set of network related threat data, wherein the set of network related threat data includes DNS related threat data (e.g., a DNS threat feed, such as a general DNS threat feed, a DNS threat feed that is associated with a first enterprise network, and/or a DNS threat feed that is associated with a first vertical); and generating a whitelist using the set of network related event data and the set of network related threat data, wherein the whitelist includes a subset of network domains included in the DNS related event data based on a data driven model of the DNS related event data and the DNS related threat data.

For example, techniques for smart whitelisting for DNS security can be applied to generate context-specific, data-driven whitelists (e.g., also referred to herein as smartlists) that automatically and dynamically adjust to changes in the production data environment (e.g., a corporation, government entity, and/or another type of entity's computer networking environment), which facilitates maximizing security protection of the production data environment while minimizing errors. Specifically, the disclosed techniques for smart whitelisting for DNS security can be applied to generate improved whitelists for DNS security and also facilitate learning from data to automatically and dynamically adjust the smartlists over time. Further, techniques for smart whitelisting for DNS security can facilitate identifying issues with a blacklist for DNS security for the production data environment (e.g., by identifying one or more items that should or should not be on the blacklist).

In some embodiments, a system/process/computer program product for smart whitelisting for DNS security in accordance with some embodiments further includes filtering the DNS related event data to generate a smart whitelist, wherein the DNS related event data is automatically filtered using a classifier to exclude one or more network domains associated with malware; and outputting the smart whitelist to a network device for filtering DNS requests using the smart whitelist (e.g., a DNS device, such as a DNS appliance, and/or another type of network/security device that can filter DNS requests using the smart whitelist).

In some embodiments, a system/process/computer program product for smart whitelisting for DNS security in accordance with some embodiments further includes filtering the DNS related event data to generate a smart whitelist, wherein the DNS related event data is automatically filtered using a classifier to exclude one or more network domains associated with malware; and periodically updating the smart whitelist based on another set of network related event data and another set of network related threat data, wherein the smart whitelist is automatically and dynamically adjusted to changes in a production data environment associated with a first enterprise network. In an example implementation, the classifier includes a statistical classifier (e.g., implemented using Bayesian statistics as further described below) that facilitates creating conditional probability distributions that are automatically and dynamically adjusted over time based on the DNS related data.

Unlike existing approaches to whitelisting that are manual or based on a fixed threshold in some data source (e.g., such as the Alexa top one hundred thousand list of websites available at https://www.alexa.com/siteinfo/100k.to, Majestic Million available at https://majestic.com/reports/majestic-million, DomCop available at https://www.domcop.com/, or other commercially/publicly available lists of top visited websites, for creating whitelists), the disclosed techniques for smart whitelisting for DNS security generate a statistical model that combines a ranking of domains, threat indicators (e.g., threat indicators from a publicly/commercially available source, such as the commercially available Infoblox Threat Intelligence Data Exchange (TIDE) solution or other public/commercially available sources of threat indicators can be similarly utilized, such as those commercially available from Internet Storm Center, DGA Archive, or SURBL, and/or a combination of two or more such threat indicator sources can be similarly utilized to implement the disclosed techniques for generating smartlists for DNS security), and a historical perspective to adjust the whitelist based on threat and customer impact (e.g., customized for the production data environment protected by the DNS security solution). For example, the disclosed techniques for smart whitelisting for DNS security generate a whitelist that ebbs and flows with the threat level that exists within the specific data source (e.g., the commercially available Infoblox Active Trust Cloud (ATC) or another DNS related data set). The disclosed techniques for smart whitelisting for DNS security solutions are not limited to DNS security but can be similarly applied to whitelists and blacklists for other security solutions (e.g., antispam and/or other security related applications that would benefit from using a context-based solution that applies a statistical classifier using two competing forces that automatically and dynamically adapts over time).

In some embodiments, the disclosed techniques for smart whitelisting for DNS security generate whitelists within specific contexts (e.g., the data environment for deployment, such as a large cloud DNS service or a specific network environment, such as a bank, university, personal device), using active threat indicators as a probabilistic measure of how popular cyber threats may become in DNS by considering the popularity of domains and using the most popular threat domain as a high watermark at a given point in time. The disclosed techniques for smart whitelisting for DNS security then perform machine learning techniques (MLT) to automatically learn an appropriate threshold for the whitelist based on the ebb and flow of this high watermark that is automatically and dynamically adjusted over time based on the data (e.g., which will differ based on the impact of threats within a given data source). As another benefit, the disclosed techniques for smart whitelisting for DNS security also facilitate identifying indicators in the threat indicator list that need further review (e.g., manual review by a security analyst and/or further automated security analysis). For example, the disclosed smartlists can be implemented for DNS security by providing the generated smartlists as prioritized whitelists that override the blacklists for a given production data environment.

In an example implementation of the above mentioned statistical classifier, a Bayesian inference model is used that is created from three factors at a given point in time: (1) the impact of blocking a domain based on its popularity within the dataset (e.g., ATC or another DNS related data set); (2) the impact of whitelisting a domain that is malicious, based on popularity; and (3) the likelihood of a domain being malicious based on active threat indicators. In this example implementation, a set of threat indicators (e.g., domains on a blacklist), hereafter labeled as THREAT, is utilized to measure how high threats reach into the specific data set (e.g., the high watermark within the DNS data source), which avoids observational bias in these techniques for enhanced DNS security using smartlists. With each whitelist creation, these techniques can use the THREAT data to update the likelihood distribution of malicious domains (e.g., posterior odds), which then feeds into the next whitelist, as further described below.

Thus, unlike existing approaches to whitelists that are based on manual entries or static thresholds around popularity and are not context-specific, the disclosed techniques for smart whitelisting for DNS security provide technical improvements that provide for the whitelist to automatically and dynamically adjust to the changing environment over time and to also be tailored to specific customer production data environments. As such, the disclosed techniques for smart whitelisting for DNS security generate whitelists using a threat feed and also can identify possible issues within the threat feed as will be further described below.

For example, the combination of measuring the impact to customers by blocking domains, conditional to the depth of known threats, allows the disclosed techniques for smart whitelisting for DNS security to dynamically model the likelihood that a domain on a whitelist will be malicious. A good whitelist is relatively limited/small in size, while protecting the vast majority of a customer's normal DNS usage from false positives (e.g., not allowing access to a website that should not be accessed, such as malware domains or other unauthorized domains, and allowing access to a web site that should be accessible for users on that production data environment, such as by including GitHub on a whitelist to prevent mistakes that would inhibit a customer's access to Github.com, but it is also generally desirable to avoid generating a whitelist that is too large in size as such may then include domains that should be blacklisted, so it is desirable to generate a dynamic whitelist that has a high degree of confidence of the domains included on the whitelist and does not want malware domains or other unauthorized domains on the whitelist). As will also be further described below, the use of a statistical classifier (e.g., implemented using Bayesian statistics as further described below) facilitates creating conditional probability distributions that are automatically and dynamically adjusted over time based on the DNS related data (e.g., unlike manually generated whitelists, which are prone to errors and continually growing and are difficult to maintain as domains manually added to a whitelist on a given date in the past may remain on the whitelist even though such domains later become malware domains).

Accordingly, the disclosed techniques for smart whitelisting for DNS security provide a context-specific solution for smart whitelisting for DNS security. For example, the disclosed techniques for smart whitelisting for DNS security can be adaptively performed for different customers by utilizing on-premises DNS data (e.g., a customer's DNS data as opposed to a general, non-customer specific DNS data), such as further described below. As another example, the disclosed techniques for smart whitelisting for DNS security can be performed for different verticals, such as ISP entities, bank entities, government entities, educational entities, and/or other types of entities. The disclosed techniques can also be implemented for a specific type of traffic, such as web browsing by client devices.

Similarly, the threat indicator source(s) can be adaptively performed for different customers by utilizing an on-premises threat indicator source of data (e.g., a customer's DNS data as opposed to a general, non-customer specific DNS data) and/or using a cloud-based threat indicator source of data, such as further described below. For example, the threat indicator source(s) of data can be specific to on-premises to be specific to a given customer's network environment and/or cloud-based to be adapted to a given vertical. As another example, assuming that source(s) of threat indicator data do not fully model the cyber threat landscape, and instead use only its infiltration of benign domain space, one or more sources of threat indicator data can be used to model the full likelihood distribution using, for example, TIDE or using a different source of threat indicators.

Various system and process embodiments for performing the disclosed techniques for smart whitelisting for DNS security will now be further described below.

Overview of a System Architecture for Smart Whitelisting for DNS Security

FIG. 1 is a diagram of a system architecture for smart whitelisting for Domain Name System (DNS) security in accordance with some embodiments. FIG. 1 illustrates a multi-stage automated DNS security analysis system that can be used for generating and deploying smart whitelists for DNS security for a production data environment (e.g., a corporation, government entity, and/or another type of entity's computer networking environment). Specifically, the multi-stage automated DNS security analysis system can be used to perform the disclosed techniques for smart whitelisting for DNS security. In an example implementation, the system can be implemented as an on-premises system and solution for generating and deploying smart whitelists for DNS security for that specific production data environment and/or as a cloud-based system and solution for generating and deploying smart whitelists for DNS security for multiple different customers (e.g., which can be tuned to their respective production data environments and/or their respective verticals as further described below).

Referring to FIG. 1, DNS threat data 102 is filtered to identify current DNS threats at 104. At 106, a popularity of the threats is determined based on event data 108 and domain popularity over a time period (e.g., a configurable time period) received from a component 110. At 114, probabilities are updated based on the new data received from components 106 and 110 to update a prior probability distribution received from a prior probability distribution component 112. The updated probabilities based on the new data (114) are utilized to generate a new whitelist (e.g., smartlist) as shown at 122, which can then be distributed over a network (e.g., the Internet or an enterprise network) to various products as shown at 124 (e.g., DNS security products or other security related products that utilized whitelists). The updated probabilities based on the new data (114) can also generate new items for review (118) by a security analyst as shown at 120. The updated probabilities based on the new data (114) are also provided to an updated probabilities distribution component 116 to then be provided and stored as the prior probability distribution 112 as shown in FIG. 1. The threat data and event data can be received periodically to continually update the whitelist over time to thereby automatically and dynamically generate whitelists (e.g., smartlists) that adapt to an evolving threat environment over time. Each of these components and processing operations will be further described below.

Figure 2:
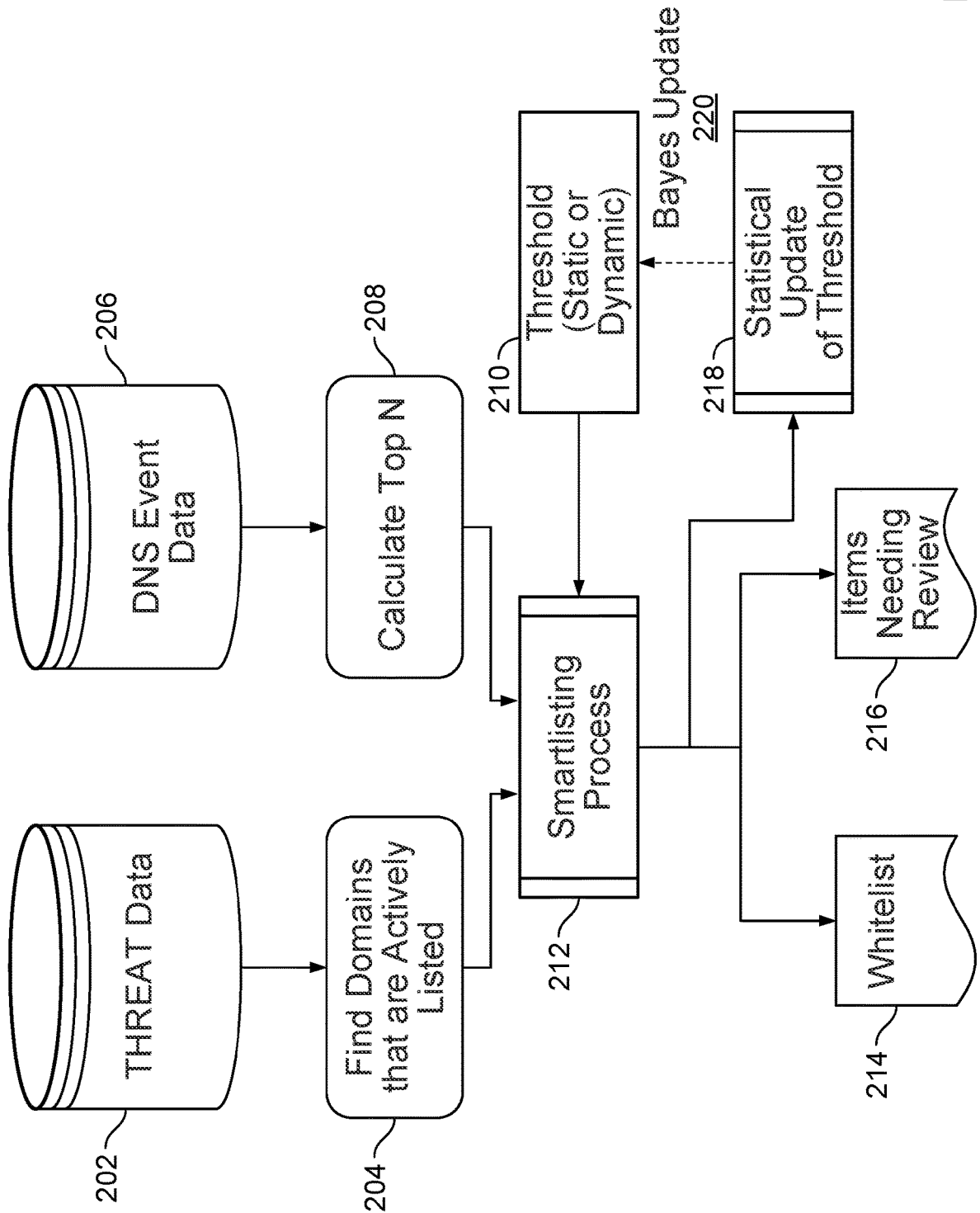
FIG. 2 is an overview of a system processing architecture for generating and deploying event-driven smartlists for DNS security in accordance with some embodiments.

Overview of a System Processing Architecture for Smart Whitelisting for DNS Security FIG. 2 is an overview of a system processing architecture for generating and deploying event-driven smartlists for DNS security in accordance with some embodiments. In this example implementation, the processing is performed using the commercially available Amazon Web Services® (AWS) S3, or as will be apparent to one of ordinary skill in the art, other cloud-based computing and storage solutions can be similarly utilized or an on-premises computing solution using server class hardware and storage solutions can be similarly utilized, to perform the disclosed processing shown in FIG. 2, which can be implemented using the system architecture as described above with respect to FIG. 1.

Referring to FIG. 2, at 202, threat indicators from a publicly/commercially available or proprietary source is stored in the commercially available Amazon Web Services® S3 inventory using Apache Parquet output format (e.g., a columnar storage file format similar to optimized row-columnar (ORC)). The threat indicators are then processed to find domains that are actively listed domains as shown at 204. At 206, event data (e.g., from various DNS security event data related sources) is also stored in the commercially available Amazon Web Services® S3 inventory using Apache Parquet output format. The event data is then processed separately to calculate the top N domains based on some configuration (e.g., a configurable time period) as shown at 208. At 212, the actively listed domains and the calculated top N domains are processed to generate a whitelist (e.g., type specific, for a given customer's production data environment and/or a specific vertical as further described below), using the threshold at 210, as shown at 214, and threat items are identified for further review by a security analyst as shown at 216. The threshold at 210 may be static (e.g., set at 75%) or dynamically derived via a machine learning algorithm. In the case a dynamic threshold is utilized, the actively listed domains and the calculated top N domains are processed to generate statistics to refine the model and adjust the threshold for future whitelists. For example, the posterior odds of overlap as shown at 218, which are provided to a Bayesian process, optionally, as shown at 220 are then utilized to update the threshold at 210 (e.g., implemented as a dynamic threshold based on the input from the Bayesian processing operation (220) as further described below). Each of these components and processing operations will be further described below.

Figure 3:
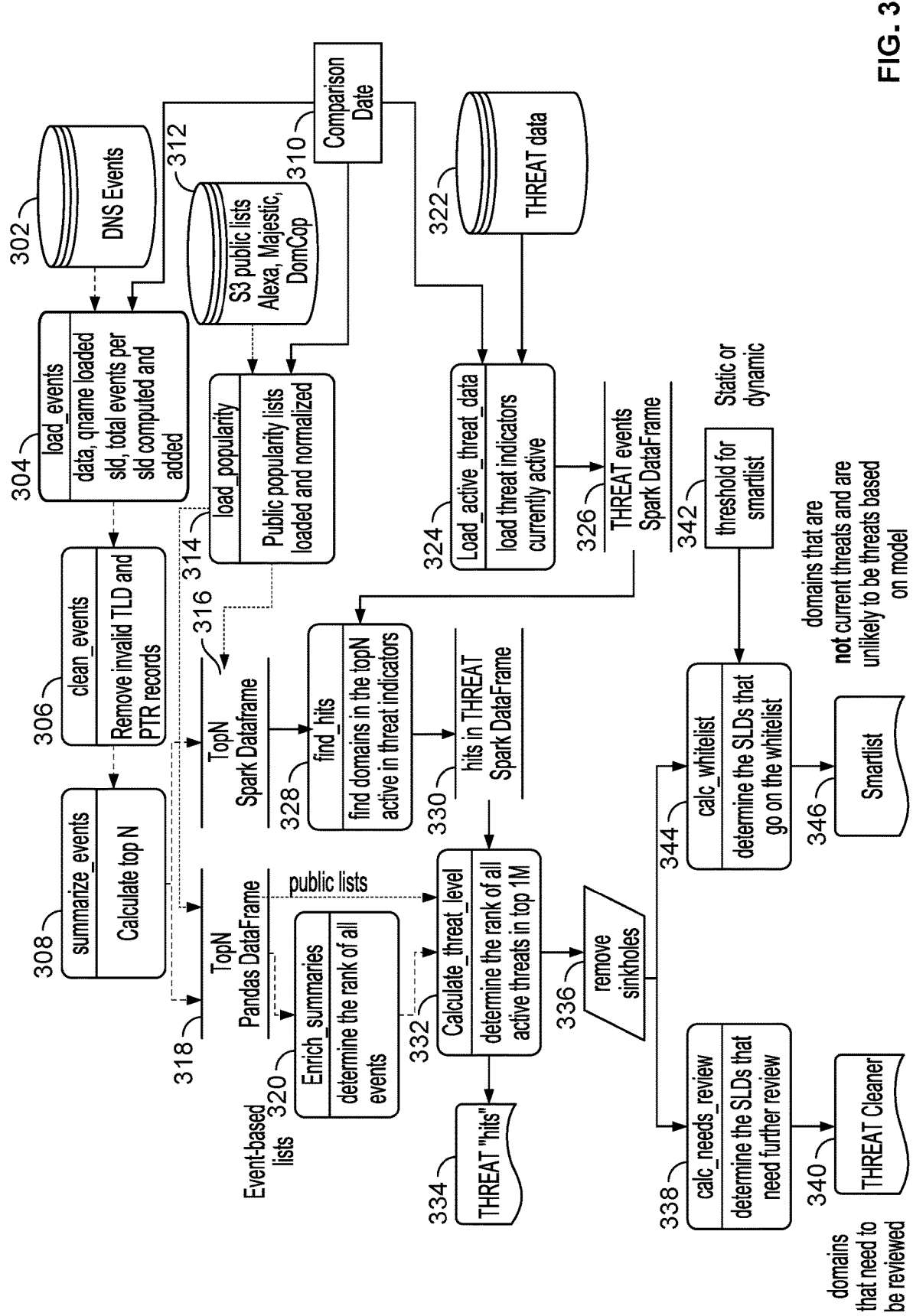
FIG. 3 is a process for generating event-driven smartlists for DNS security in accordance with some embodiments.

FIG. 3 is a process for generating event-driven smartlists for DNS security in accordance with some embodiments. Smartlisting generally refers to the disclosed techniques for generating data-driven whitelists and, in some embodiments, can additionally include evaluating existing blacklist indicators. As described with respect to various embodiments, smart whitelisting can be implemented to generate a whitelist of a relatively small/minimal size while still reducing risks of the potential disruption to a customer's enterprise network through false positives in indicator sources. Generally, whitelisting is a balance between protecting enterprise networks and avoiding disruption to their activity on such enterprise networks. As disclosed with respect to various embodiments, smartlisting automatically and dynamically balances between protecting enterprise networks and avoiding disruption to their activity on such enterprise networks based on the event and DNS data as further described herein. For example, as shown in FIG. 3 described below, there are two types of sources of potential benign data: raw event data and publicly available domain popularity lists.

Event Processing

Referring to FIG. 3, the event-based processing uses a variety of commercially available and proprietary event data, aggregated by second-level domain (SLD) as shown at 302, and popularity of domains over time (e.g., Alexa, Majestic, and DomCop) as shown at 312. The Event Summaries data stored at 302 (e.g., commercially available and proprietary DNS related event data) is then processed at a load events stage 304, which also receives comparison date 310 as an input, and processing at load events stage 304 includes loading data, qualified name (qname) that computes and adds a total number of events per SLD. At 306, the event data is cleaned to remove invalid top-level domains (TLDs) and pointer (PTR) records (e.g., used for the reverse DNS lookup) and then the events are summarized at 308 to calculate a top one million domains (e.g., or another threshold number of top domains). These summaries can be generated by performing the domain summarization process on a daily basis or another periodic basis. As similarly described above with respect to FIG. 2, smart whitelists are created from data based on popularity over a period of time (e.g., 5-7 days or another threshold period of time). The whitelists are fed into cyber security products (e.g., DNS Firewalls and client devices). In an example implementation, a threshold is determined based on significant historical data analysis as further described below. In this example implementation, the whitelists are scrubbed of known threats, as identified by membership in the THREAT dataset. In this example implementation, the smartlist uses overall popularity, not normalized by other factors. The 'high watermark' of threat indicators is recorded and used to create a version of the smartlisting that learns from known threats as further described below.

Public Popularity Processing

As shown at 312, the public popularity processing uses various public domain popularity lists, such as Alexa, DomCop, and Majestic data as similarly described above with respect to FIG. 2. In this example implementation, the lists include daily top N number of popular domains, by descending popularity rank. Each of these popular domain data sources may generate domain popularity lists based on various different criteria. The public domain popularity lists data stored at 312 are processed at a load popularity stage 314, which also receives comparison date 310 as an input, and processing at load popularity stage 314 includes loading and normalizing the public popularity lists as further described below. In this example implementation, the smart whitelists are created from a single day of collected data. The whitelists are fed into cyber security products, e.g., DNS Firewalls. Domains that are known threats are removed from the whitelists. The ranks for popular domains that contain threat indicators are recorded to be used in a future dynamic model for smartlisting.

Common Processing of Events and Public Domain Popularity Lists

As shown at 316 and 318, the output of the load_popularity stage 314 and the summarize_events stage 308 are each fed into both a TopN Spark DataFrame 316 and a TopN Pandas DataFrame 318. In this example implementation, the Pandas DataFrame and the Spark DataFrame are used to efficiently perform big data/cluster processing, such as various functionalities to analyze, change, and/or extract information from the given datasets.

Referring to the processing performed using the TopN Pandas DataFrame 318, event-based lists are provided to an enrich_summaries stage 320 to determine the rank of the events. Referring to the threat indicator (THREAT, in this example implementation) data processing to be fed into the TopN Spark DataFrame processing, THREAT data stored in an S3 data store as shown at 322 is provided to a load_active_threat_data stage 324 to select relevant current threats and then these filtered THREAT events are output at 326 to then be provided to the TopN Spark DataFrame processing. Referring to the processing performed using the TopN Spark DataFrame 316, event-based lists are provided to a find_hits stage 328 to find domains in the top N domains that are active threats in THREAT and then output as hits in THREAT Spark DataFrame as shown at 330. Referring to the processing performed using the TopN Pandas DataFrame 318, event-based lists are provided to enrich_summaries stage 320 to determine the rank of the events. The public lists and output of the enrich_summary stage 320 as well as the hits in THREAT Spark DataFrame 330 are provided to calculate_threat_level stage 332 to determine the rank of the active THREAT in the top N domains and then output to THREAT "hits" as shown at 334 (e.g., the THREAT "hits" output includes information about threat indicators found in relatively popular domains and can include domain, rank, threat information (e.g., Malware or phishing domain), etc.). The output of the calculate_threat_level stage 332 is further filtered based on fixed decision logic (e.g., the removal of known sinkhole domains). The filtered output from stage 336 is fed into a calc_needs_review stage 338 and also fed into a calc_whitelist stage 344. The calc_needs_review stage 338 determines the SLDs that need further review, which is then provided to a review stage 340, which identifies the domains to be further reviewed prior to whitelisting. The calc_whitelist stage 344 determines the domains that go on the whitelist based on a threshold input for the smartlist as shown at 342 to generate a Smartlist 346, which includes the filtered set of domains that are not included in the THREAT dataset and are popular.

In this example implementation, the top N domains (e.g., top one million domains) are generated and stored as a byproduct of this process. A list of domains requiring further review (340) is created based on the overlap of THREAT with the proposed whitelist. These are domains for THREAT indicators, which should generally be reviewed further (e.g., by a security analyst and/or using a further automated security analysis). In some cases, it is possible that these indicators are not valid threat indicators, are overly broad, or should have a modified TTL value. The domains requiring further review contain, in this example, only SLDs that are tasked in THREAT and meet the additional filtering at 336.

Output of the Common Processing of Events and Public Domain Popularity Lists

In this example implementation, the above-described processing is creating several outputs with multiple purposes. First, a whitelist is generated for each source based on popularity, cleaned/filtered of THREAT domains. Second, a list of all threat indicators found in popular domains and the rank of those in each source is output. Third, a top N list for each source is output (e.g., top one million). These are stored historically as well as in a 'most recent' version; and items in THREAT that are provided for further review.

Statistical Classifiers for Whitelists and Threat Review

The above-described smartlisting processing for DNS security is performed based on two types of sources of potential benign data: (1) raw event data; and (2) publicly published popularity lists for domains. From a whitelisting perspective, smartlisting is a classifier for domains that can be implemented to effectively whitelist a majority of a customer's normal traffic to ensure it is not disrupted by false positives in various threat feeds while minimizing the likelihood that it does not allow true threats into the customer's network.

Event Model

As similarly described above (e.g., such as the embodiments described above with respect FIGS. 1-3), a smartlisting classifier for domains can be implemented to consider data in the context of a given rank measure (e.g., popularity), and locate a threshold above which such domains can be classified as whitelisted. In some embodiments, rank is measured by the cumulative density of activity within customer networks. As will be apparent to one of ordinary skill in the art, other measures of impact can be similarly used to measure the rank, such as open source popularity ranks.

Figure 4A:
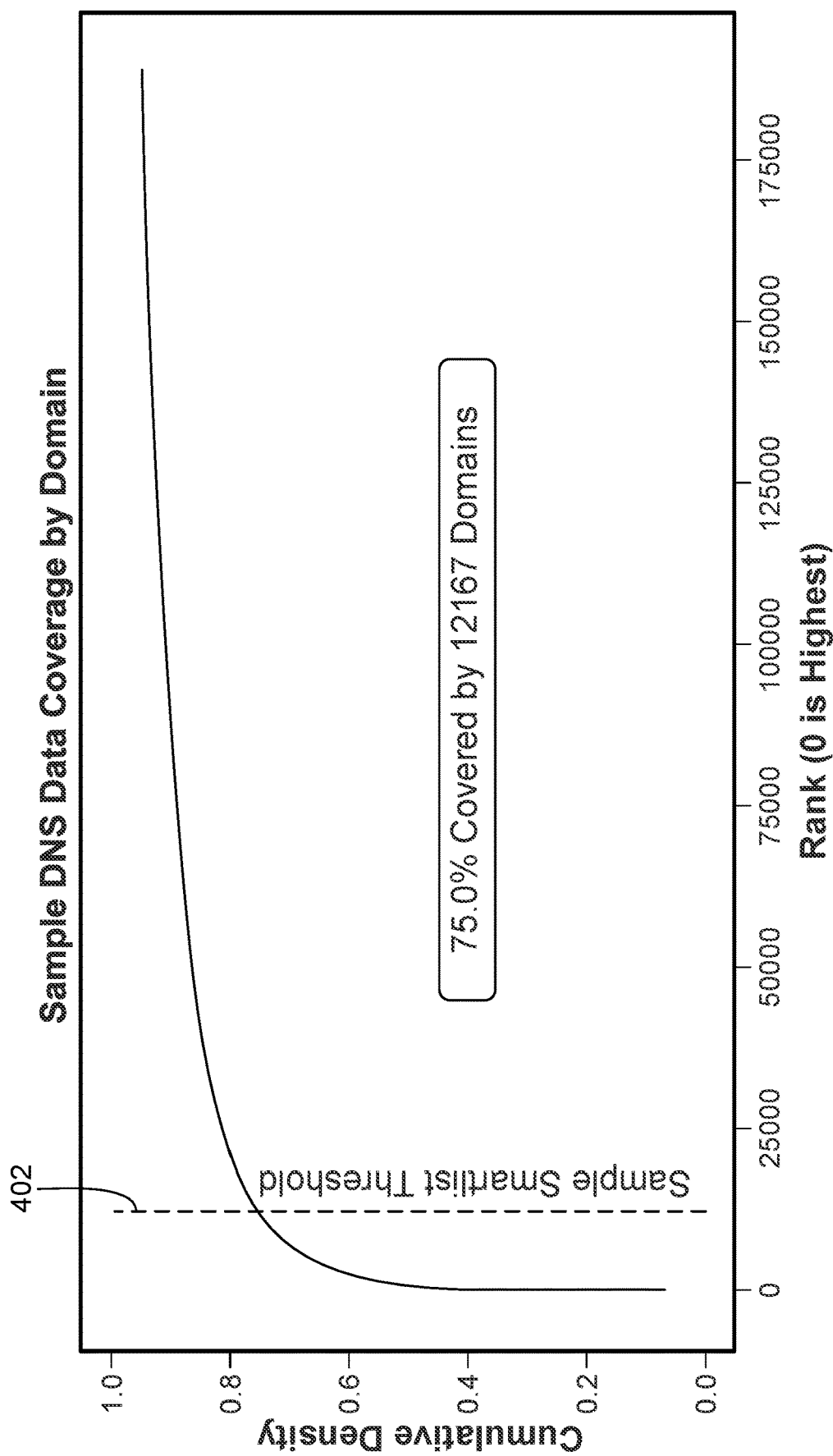
FIG. 4A is a graph of a cloud-based security solution's data coverage by domain in accordance with some embodiments.

FIG. 4A is a graph of a cloud-based security solution's data coverage by domain in accordance with some embodiments. As an example, FIG. 4A illustrates the cumulative density for a DNS event data source over a one-week period. In this case, 75% of all events are within ~12,000 domains, as indicated by the vertical threshold as shown at 402. Notice though that this threshold is after the slope of the cumulative distribution function (CDF) has substantially decreased. As a result, to increase whitelist coverage by approximately 5% of events, we would then double our whitelisted domains, increasing the risk of whitelisting a malicious domain(s).

In an example implementation, based on evaluating approximately one month of data and the interaction with THREAT indicators, a static threshold is chosen as a balance between coverage of the customer space and risk tolerance (e.g., 75% cumulative density). As a result, in this example implementation, when utilizing a static threshold mechanism, the weekly whitelist contains a variable number of domains that accounts for 75% of the traffic in the previous week.

In an example implementation, after identifying the top domains, the domains above the threshold that are in THREAT are removed. In other implementations, these would not be removed from the whitelist. These overlapping domains are flagged, plus an additional proximity of 5% of the threshold as domains that are identified for manual review as similarly described above. These domains can be used for threat indicator cleaning, or smart blacklisting. In this example implementation, utilizing a static threshold based on cumulative density, domains in THREAT that have an SLD that is in the top 75% of the ranked domains can be removed from the whitelist and flagged for further review as similarly described above.

Figure 4B:
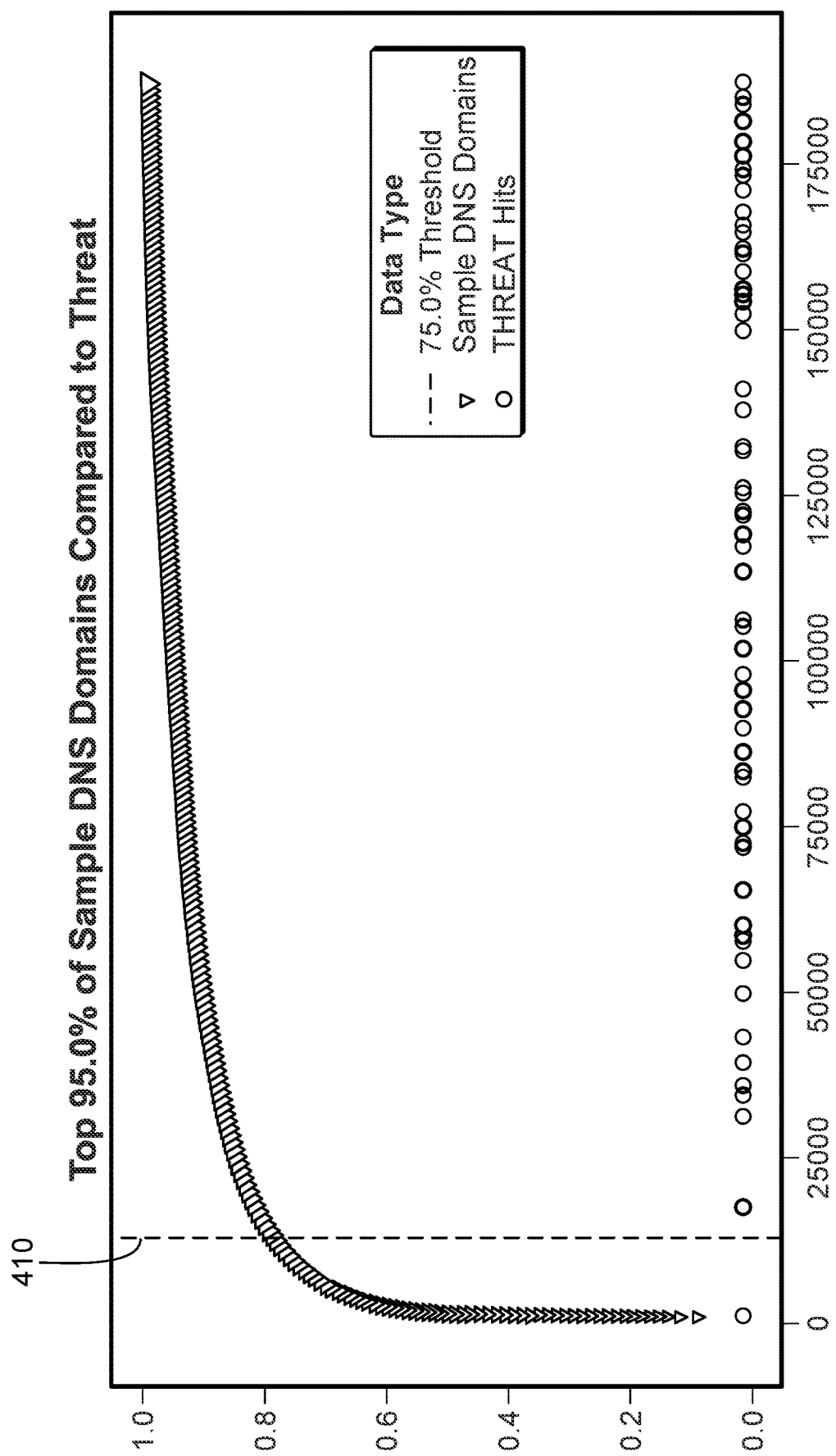
FIG. 4B is a graph of the top 95% of a sample DNS data source coverage by domain compared to DNS threat data in accordance with some embodiments.

FIG. 4B is a graph of the top 95% of a sample DNS data source coverage by domain compared to DNS threat data in accordance with some embodiments. FIG. 4B illustrates how the THREAT data, aggregated at the SLD level, overlaps with the DNS queries seen in a sample DNS event source. In this example, we only view the top 95% of the domains as shown at 410, by volume, in order to see the graph better, as the data is highly skewed. As shown, the THREAT domains overlap with the ranked domains in this range, and a few poke into the top 75%.

In some embodiments, overall popularity by events is utilized to perform the disclosed event-based processing for generating smartlists for DNS security. In other embodiments, a different rank measure is utilized. As described below, the disclosed techniques can be implemented even when the underlying rank measure, that is, the function that determines the rank ordering of the domains, is unknown.

Public Popularity Model

As similarly described above, public popularity analysis is also utilized in performing the disclosed techniques for generating smartlists for DNS security. In an example implementation, public popularity analysis includes utilizing publicly available lists, such as the Alexa top one hundred thousand list of websites available at https://www.alexa.com/siteinfo/100k.to, Majestic Million available at https://majestic.com/reports/majestic-million, DomCop available at https://www.domcop.com/, or other commercially/publicly available lists of top visited websites.

As illustrated in the above-described embodiments, the disclosed techniques for generating smartlists for DNS security utilize smartlists in combination with a threat indicator evaluation (e.g., in an example implementation, threat indicators from a publicly/commercially available source, such as the Infoblox Threat Intelligence Data Exchange (TIDE) solution or other publicly/commercially available sources of threat indicators can be similarly utilized for such threat evaluations, and/or a combination of two or more such threat indicator sources can be similarly utilized for such threat evaluations to implement the disclosed techniques for generating smartlists for DNS security).

Figure 5:
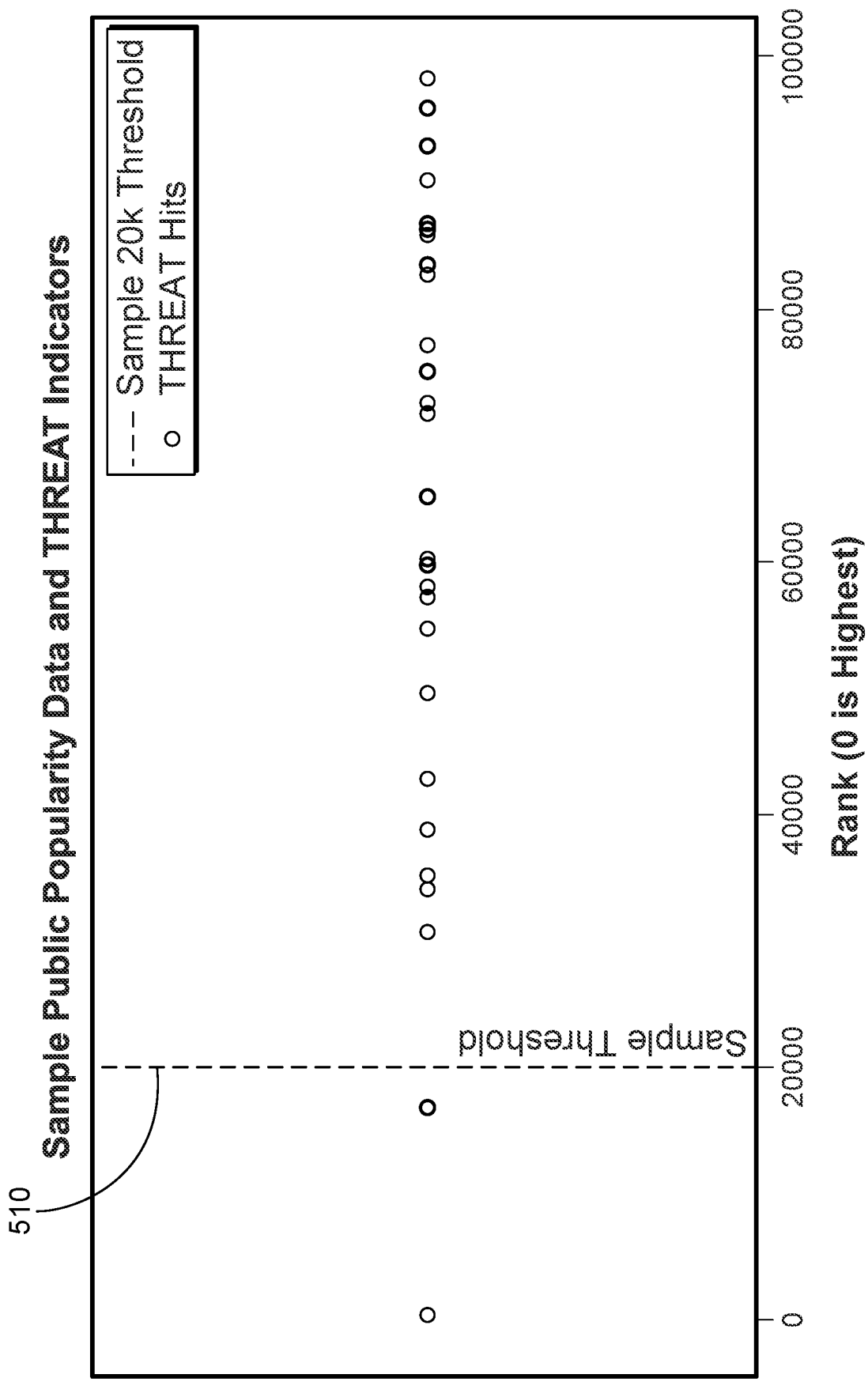
FIG. 5 is a plot that illustrates example sets of popular domains compared to threat indicators in accordance with some embodiments.

FIG. 5 is a plot that illustrates example sets of popular domains compared to threat indicators in accordance with some embodiments. Specifically, FIG. 5 illustrates how publicly available lists of popular domains may compare to threat indicators in accordance with some embodiments. As similarly discussed above, previous approaches whitelisted the top 100k domains for these lists, without any threat indicator evaluation. From the plot shown in FIG. 5, numerous THREAT hits can be observed within this range, meaning that such previous approaches would result in whitelisting questionable domains (e.g., malware domains or potentially malware domains). Hence, a similar approach to the event-based data previously described is implemented into the publicly available data sources.

However, the publicly available lists may not disclose the method by which they determine the rank ordering or provide insight into the breadth of underlying data sources. The lists contain daily ranks, for example, the top one million popular domains, by descending popularity rank as determined independently by each provider using different criteria. Even without the information necessary to calculate the cumulative density function as done in the event-based whitelist creation, we can calculate the overlap of threat indicators with the ranking and determine thresholds for whitelisting. In some embodiments, one can, for example, proxy the publicly available ranks into event data to obtain an approximately cumulative density function.

In an example implementation, after evaluating a period (e.g., weeks or months or another time period) of data and the interaction with THREAT indicators, a 20,000 static rank threshold is chosen at 510. As is clear from FIG. 5, there may still be active threats with a popularity rank above this threshold. The threshold can be adjusted to account for risk tolerance within the customer environment.

As such, in some embodiments, following a similar process as described above with respect to event evaluation using threat indicators, all domains above the static threshold at 510 are whitelisted after removing the ones that meet a further filter (e.g., removing known sinkholed domains). In some cases, the removed domains can be identified for further review (e.g., manual review by a security analyst and/or other further automated security analysis) and a determination as to whether they should be removed from THREAT (e.g., and/or another threat indicator source(s)) or not (e.g., the above described THREAT cleaner component can be utilized to implement these disclosed techniques). In an example implementation, these overlapping domains can be flagged for such further analysis, including a margin above the set threshold.

In another embodiment, alternative popularity models can be implemented to perform the disclosed techniques for generating a smartlist for DNS security. The above-described embodiments utilize overall popularity. An alternative embodiment could be implemented to use an alternate rank measure.

Bayesian Inference Model for Implementing the Statistical Classifier

In some embodiments, a Bayesian inference model is utilized to perform the disclosed techniques for implementing the statistical classifier that is used for generating smartlists for DNS security. As similarly described above with respect to various embodiments (e.g., including components 112, 114, and 116 of FIG. 1 as described above and at components/stages 218 and 220 of FIG. 2 as described above), a dynamic smartlist can be generated by using the high watermark of THREAT (i.e., one or more threat indicator data sources) to learn an appropriate threshold within each data source and context for a whitelist.

In an example implementation, we begin with two competing forces, the popularity of all domains in a given context (e.g., within a particular product or customer network), which is a proxy for the impact of blocking any given domain on a given set of DNS data, and the distribution of threats, as observed via THREAT, relative to a popularity measure, which creates a rank order of the domains. The underlying hypothesis is that domains that are popular enough are unlikely to represent true cyber threats, while at the same time, some threats associated with domains (e.g., malware domains) can rise quite high in popularity. Moreover, the rank to which malicious domains can rise will generally ebb and flow over time. As such, a statistical threshold is to be determined, which allows for an effective separation of the good/safe domains (e.g., non-malware or known good domains) from the rest with a high degree of confidence as further described below. While the various embodiments described above use popularity measures, other embodiments can similarly use any number of additional factors (e.g., domain history, name server reputation). In other embodiments, customer-specified risk models are incorporated (e.g., domain categorization, types of devices within the network), which can be used to fine tune the whitelist threshold. In addition, while we use a popularity model based on cumulative density in various embodiments described above, an appropriate ranking that is functionally similar can be used in various other embodiments. As a result, a data source such as the Majestic Million open source rankings can be similarly used as another data source without changing the above-described techniques for generating smartlists for DNS security.

In this example implementation, this process uses Bayesian conditional probability models to compute the threshold. Using a significant period of traffic over time for threats and popularity, we create an informed prior likelihood distribution for the maximum threat rank. For a given whitelist, we calculate the popularity rank of all domains over a set period of time (e.g., a week or another set period of time). We calculate the corresponding rank distribution of current known threats, and determine the high watermark, that is, the most popular threat we observe in the data set. This observation is used to update the likelihood model using Bayes Theorem, creating the posterior probability distribution. This probability of this observation given a hypothesis, also called the likelihood distribution, can be modeled in various different ways; the example implementation again uses a Gaussian centered at the value. The value of the posterior distribution with the maximum likelihood becomes our new threshold. Our whitelist contains everything with a cumulative density less, or alternatively with greater popularity, than the threshold. In the example implementation, an informed prior is created through data analysis, but in other embodiments a uniform prior or other prior distribution, as well as other selections for the likelihood distribution would be used. Our THREAT cleaner (e.g., the THREAT cleaner component as similarly described above) highlights all putatively malicious domains that are above the threshold plus some optional predetermined threshold padding (e.g., 5% or some other threshold padding value). For example, this padding counters the natural fluidity of popularity values.

As a specific example, suppose our prior probability distribution is a Gaussian distribution centered around the 75%, or 0.75, cumulative density. Thinking of this as the probability distribution for the highest rank a threat will reach within our data set, the maximum likelihood is 0.75, meaning that a threshold of 0.75 will most likely be the maximum level. The true level could be greater, or lower, but these occur with lower probability. The maximum likelihood can then be used as our threshold for whitelists. While the maximum likelihood of the posterior probability distribution is used in this example, in other embodiments, one can use alternate statistical criteria as would now be apparent to one of ordinary skill in the art.

Figure 6:
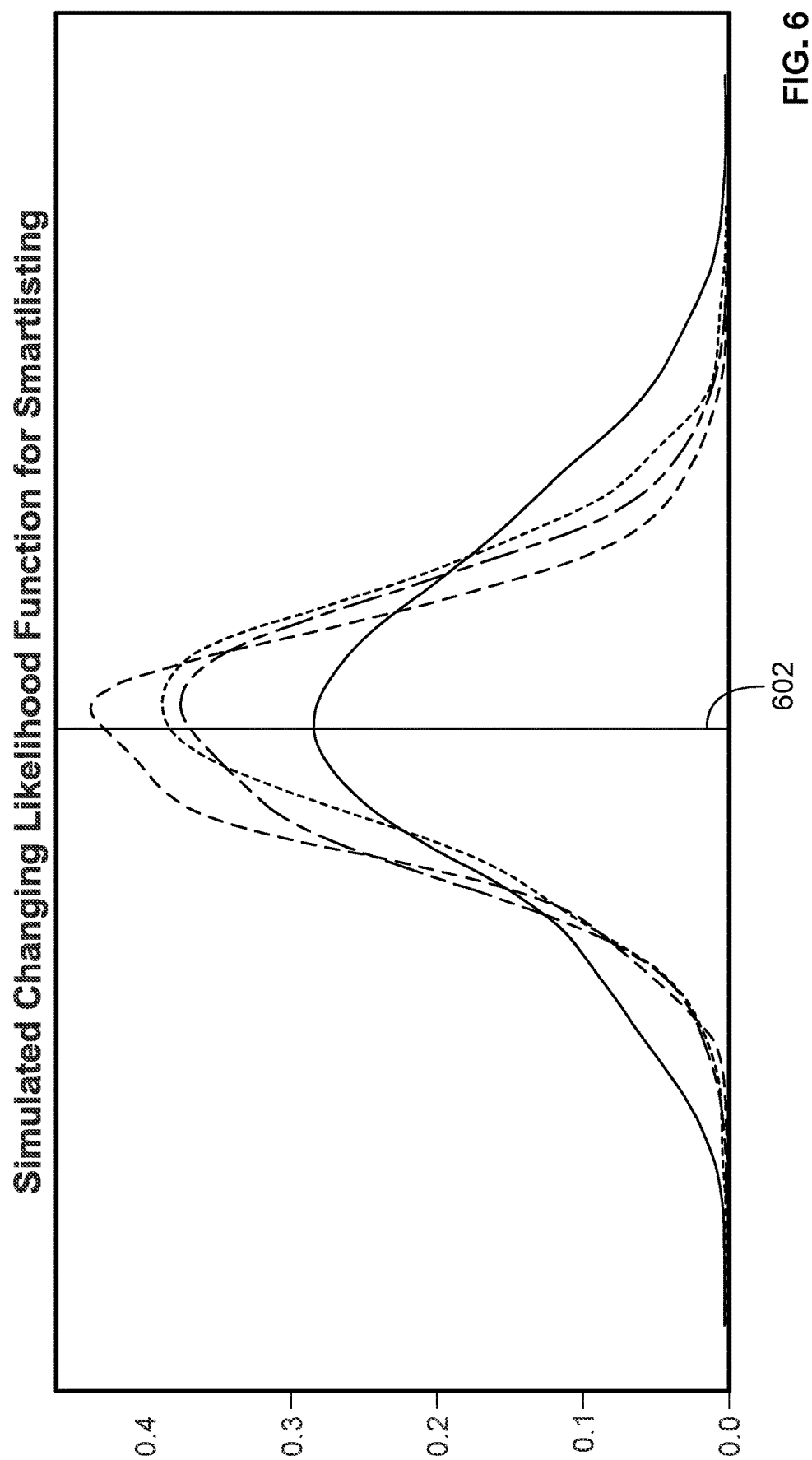
FIG. 6 is a chart illustrating a simulated changing likelihood function for smartlisting in accordance with some embodiments.

FIG. 6 is a chart illustrating a simulated changing likelihood function for smartlisting in accordance with some embodiments. This chart shows an increasing threshold (e.g., shown at 602) based on new malware domain observations for a likely threshold over time (e.g., as such changes occur over time based on new data sets for popularity and for threat data).

As an example, if the highest threat observed occurs at the 0.73 level that week, we might choose to model the probability for that being correct as a Gaussian distribution centered around each hypothesis. The posterior probability distribution is then calculated, according to Bayes Theorem, by multiplying the current likelihood distribution by the prior probabilities. This will raise the probability around 0.73 and reduce it for values far away from that point. The maximum likelihood of the posterior odds distribution is the new threshold, which may still be some distance from the observed value of 0.73. Each time we compute a new whitelist, we update the probabilities using the observed data. The Bayes model is tuned to ensure the threshold moves, but does not swing, with new observations. As the threat level increases or decreases, the threshold will automatically and dynamically be adjusted using these disclosed techniques.

In another embodiment, alternative likelihood models can be used to similarly perform these techniques for determining this threshold. For example, Bayesian approaches are highly reliant on an appropriate model for the prior probability distribution. In our case, this is the likelihood that the highest cyber threat will occur within the top x % of customer DNS activity. In this example implementation, we have seeded our approach based on an in-depth analysis of 60 days of available DNS and threat indicator data. As an alternative, one could change both the initial likelihood distribution (e.g., using uninformed priors or a different approach to informed priors) and the likelihood distribution for an observation. In other embodiments, various other machine learning/classifier techniques can be used to similarly perform these techniques including, for example, Support Vector Machine (SVM), k-nearest neighbor (KNN), logistical regression, neural net, and/or any other ML/classifier algorithm can similarly be applied to implement the disclosed techniques, but such may have a different performance impact and/or effectiveness for this whitelisting for DNS security application context.

In another embodiment, instead of a one-dimensional model, a multi-dimensional model can be implemented to perform the disclosed techniques for determining this threshold. For example, additional dimensions can consider various other factors, such as one or more of the following example factors: whether the DNS queries are being received from multiple different computing/networked devices (e.g., client devices) versus a single computing/networked device; a number of client IPs; and a time of day of the DNS queries. In this example, an SVM can be implemented that can support more complicated decision boundaries (e.g., the impact can be relatively small if a DNS query is only associated with one client device, and/or the generated smart whitelist can be dynamic based on a time of day associated with the DNS data for the customer or vertical).

Threat Feed Cleaning

The smartlisting process also provides an effective mechanism to identify items in a blacklist that may not be malicious (e.g., domains that may be misclassified as malware domains, such as domains that were misclassified by machine learning tools for identifying malware domains or other types of misclassifications that can occur due to human error, automated classification errors, and/or domains that may no longer be associated with malware). In an example implementation, when the whitelist is generated, we identify any domains that are within a padded distance from the threshold. For example, if the threshold is 75%, we can consider all blacklisted domains that fall within the top 80% of customer events based on a 5% padding threshold in this example. As similarly described above, a padding threshold is an effective mechanism to compensate for the uncertainty that exists in such domain popularity measures.

Automation and Deployment

In some embodiments, the disclosed smartlisting for DNS security process generates one whitelist from each available source of DNS events and publicly available popularity lists for domains (e.g., Alexa, DOMCOP, Majestic, and/or other such data sources can be similarly used for publicly available popularity lists for domains). In other embodiments, these sources and/or final whitelists are combined via a statistical function.

Considering the multiple data sources, automation is desired to create a reproducible product with no or minimal human interaction or interruption. In an example implementation, the code is designed in a way to standardize the various data set schemas into a normalized/standard format and to also be a command-line reproducible script to automatically generate and store the outputs in their appropriate databases. In this example implementation, the deployment portion is to support the automatic creation and release/deployment of whitelists. The smart whitelists can be automatically generated by a scheduled job (e.g., a cron job) that meets a predetermined whitelist release date (e.g., every Monday or some other predetermined whitelist release date). In other embodiments, the whitelist process can be run on streaming data, adjusting both the reference ranking data and the threshold in near real-time.

Example Processes for Smart Whitelisting for DNS Security

Figure 7:
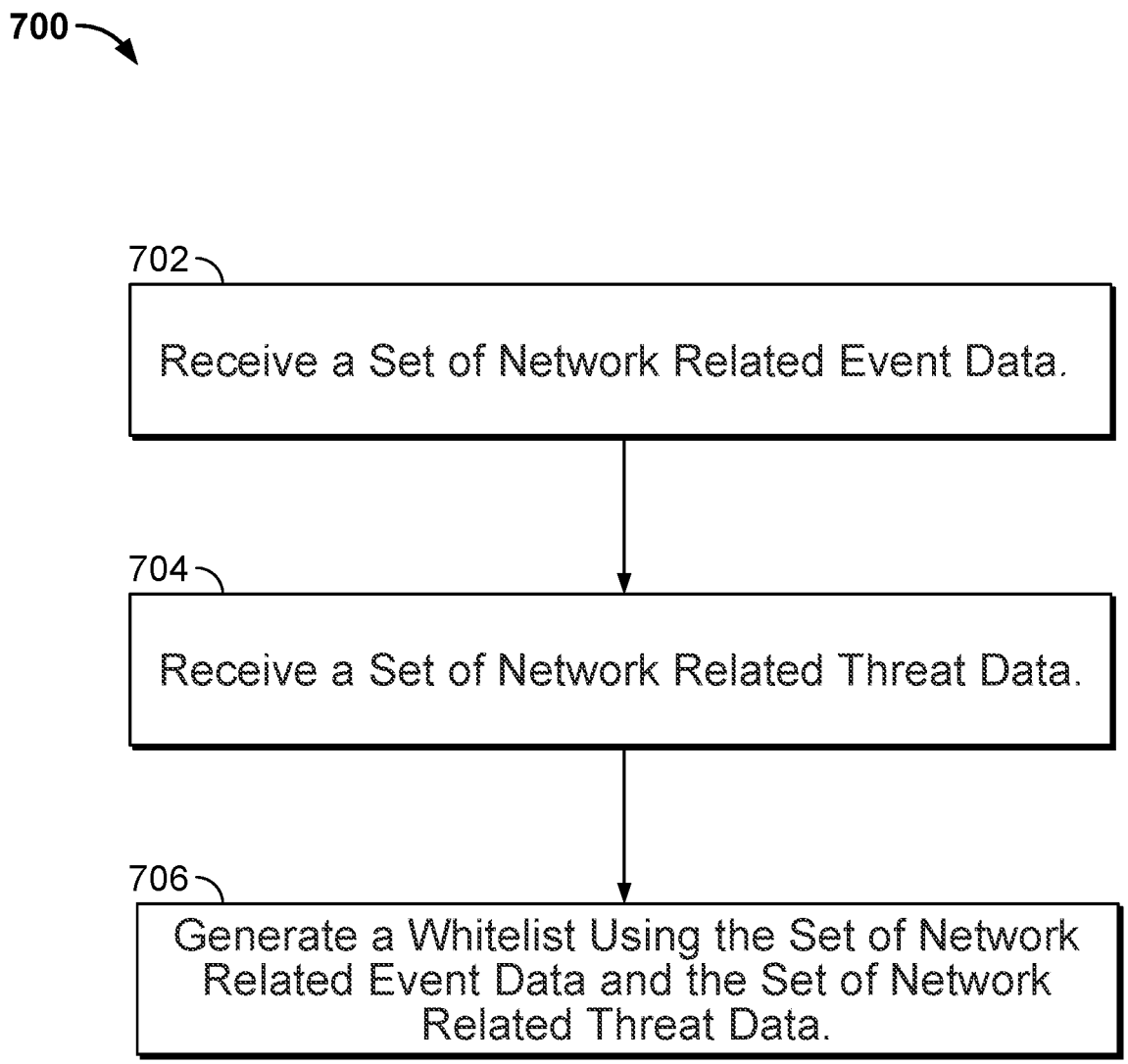
FIG. 7 is a flow diagram illustrating a process for smart whitelisting for DNS security in accordance with some embodiments.

FIG. 7 is a flow diagram illustrating a process for smart whitelisting for DNS security in accordance with some embodiments. In various embodiments, process 700 is performed by the system(s) and processing techniques described above with respect to FIGS. 1 through 6.

At 702, a set of network related event data is received. For example, a set of network related event data can include Domain Name System (DNS) related event data, such as a set of popular network domains as similarly described above. Alternative network related event data includes URL requests generated via web browsing and transmission of IP packets for general IP traffic.

At 704, a set of network related threat data is received. For example, the set of network related threat data can include DNS related threat data, such as a DNS threat feed, including a general DNS threat feed, a DNS threat feed that is associated with a first enterprise network, and/or a DNS threat feed that is associated with a first vertical, as similarly described above.

At 706, generating a whitelist using the set of network related event data and the set of network related threat data is performed. For example, the whitelist can be generated to include a subset of network domains included in the DNS related event data based on a data driven model of the DNS related event data and the DNS related threat data as similarly described above.

Figure 8:
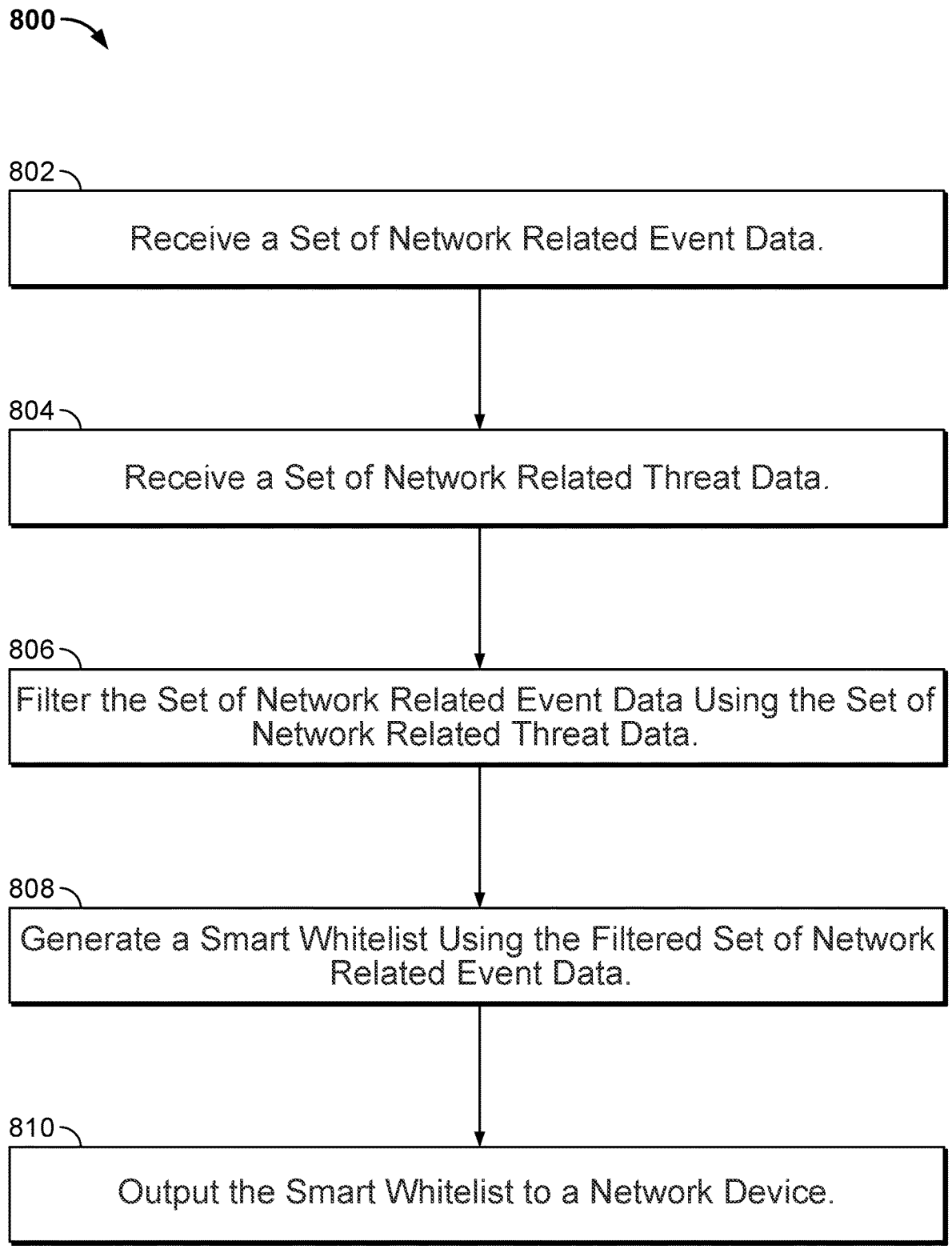
FIG. 8 is another flow diagram illustrating a process for smart whitelisting for DNS security in accordance with some embodiments.

FIG. 8 is another flow diagram illustrating a process for smart whitelisting for DNS security in accordance with some embodiments. In various embodiments, process 800 is performed by the system(s) and processing techniques described above with respect to FIG. 1 through 6.

At 802, a set of network related event data is received. For example, a set of network related event data can include Domain Name System (DNS) related event data, such as a set of popular network domains as similarly described above.

At 804, a set of network related threat data is received. For example, the set of network related threat data can include DNS related threat data, such as a DNS threat feed, including a general DNS threat feed, a DNS threat feed that is associated with a first enterprise network, and/or a DNS threat feed that is associated with a first vertical, as similarly described above.

At 806, the set of network related event data is filtered using the set of network related threat data. For example, the DNS related event data can be filtered to generate a smart whitelist (e.g., smartlist), in which the DNS related event data is automatically filtered using a classifier to exclude one or more network domains associated with malware. In an example implementation, the classifier includes a statistical classifier (e.g., implemented using Bayesian statistics) that facilitates creating conditional probability distributions that are automatically and dynamically adjusted over time based on the DNS related data as similarly described above. As also similarly described above, the smartlist can be periodically updated based on another set of network related event data and another set of network related threat data (e.g., the smart whitelist can be automatically and dynamically adjusted to changes in a production data environment associated with a first enterprise network).

At 808, generating a smart whitelist using the filtered set of network related event data is performed. For example, the smart whitelist (e.g., smartlist) can be generated to include a subset of network domains included in the DNS related event data based on a data driven model of the DNS related event data and the DNS related threat data as similarly described above.

At 810, the smart whitelist is output to a network device. For example, the smart whitelist (e.g., smartlist) can be output to a network device for filtering DNS requests using the smartlist (e.g., the smartlist can be output to a DNS device, such as a DNS appliance, and/or another type of network/security device that can filter DNS requests using the smartlist) as similarly described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
    a processor configured to:
        receive a set of network related event data, wherein the set of network related event data includes Domain Name System (DNS) related event data, comprises to:
            determine a total number of events of the set of network related event data per second-level domain (SLD); and
            remove invalid top-level domains (TLDs) and invalid pointer PTR) records from the total number of events per SLD to obtain the DNS related event data;
        receive a set of network related threat data, wherein the set of network related threat data includes DNS related threat data, and wherein the DNS related threat data includes a DNS threat feed that is automatically filtered to determine a popularity of network domains associated with malware;
        generate a whitelist using the set of network related event data and the set of network related threat data for policy enforcement based on a configured security policy for an enterprise network, wherein the whitelist includes a subset of network domains included in the DNS related event data based on a data driven model of the DNS related event data and the DNS related threat data, wherein the generating of the whitelist comprises to:
            determine the top N domains based on the set of network related event data; and
            filter, using a threshold, the top N domains to obtain the whitelist, wherein the threshold relates to a number of top domains or popularity over a period of time, wherein the threshold is static or dynamically derived via a machine learning technique, wherein the threshold is updated based on input from a Bayesian conditional probability model, wherein the DNS related event data is automatically filtered using a classifier to exclude one or more network domains associated with malware, and wherein the filtering of the top N domains comprises to:
                determine a rank of active threats in the top N domains; and
                output domains in the top N domains having an active threat to the whitelist;
        output the whitelist to a network device for filtering DNS requests using the whitelist; and
        identify a network domain for further evaluation to determine whether the network domain is properly included on a blacklist; and
    a memory coupled to the processor and configured to provide the processor with instructions.

2. The system recited in claim 1, wherein the DNS related event data includes a set of popular network domains.

3. The system recited in claim 1, wherein the DNS related threat data includes a DNS threat feed.

4. The system recited in claim 1, wherein the DNS related threat data includes a DNS threat feed that is associated with a first enterprise network.

5. The system recited in claim 1, wherein the subset of network domains included in the whitelist are selected using a classifier.

6. The system recited in claim 1, wherein the subset of network domains included in the whitelist are selected using a statistical classifier.

7. The system recited in claim 1, wherein the processor is further configured to:
    periodically update the whitelist based on another set of network related event data and another set of network related threat data, wherein the whitelist is automatically and dynamically adjusted to changes in a production data environment associated with a first enterprise network.

8. A method, comprising:
    receiving a set of network related event data, wherein the set of network related event data includes Domain Name System (DNS) related event; data, comprises:
        determining a total number of events of the set of network related event data per second-level domain (SLD); and
        removing invalid top-level domains (TLDs) and invalid pointer (PTR) records from the total number of events per SLD to obtain the DNS related event data;
    receiving a set of network related threat data, wherein the set of network related threat data includes DNS related threat data, and wherein the DNS related threat data includes a DNS threat feed that is automatically filtered to determine a popularity of network domains associated with malware;
    generating a whitelist using the set of network related event data and the set of network related threat data for policy enforcement based on a configured security policy for an enterprise network, wherein the whitelist includes a subset of network domains included in the DNS related event data based on a data driven model of the DNS related event data and the DNS related threat data, wherein the generating of the whitelist comprises:
        determining the top N domains based on the set of network related event data; and
        filtering, using a threshold, the top N domains to obtain the whitelist, wherein the threshold relates to a number of top domains or popularity over a period of time, wherein the threshold is static or dynamically derived via a machine learning technique, wherein the threshold is updated based on input from a Bayesian conditional probability model, and wherein the DNS related event data is automatically filtered using a classifier to exclude one or more network domains associated with malware, and wherein the filtering of the top N domains comprises:
            determining a rank of active threats in the top N domains; and
            outputting domains in the top N domains having an active threat to the whitelist;
    outputting the whitelist to a network device for filtering DNS requests using the whitelist; and
    identifying a network domain for further evaluation to determine whether the network domain is properly included on a blacklist.

9. The method of claim 8, wherein the DNS related event data includes a set of popular network domains.

10. The method of claim 8, wherein the DNS related threat data includes a DNS threat feed.

11. The method of claim 8, wherein the DNS related threat data includes a DNS threat feed that is associated with a first enterprise network.

12. The method of claim 8, wherein the subset of network domains included in the whitelist are selected using a classifier.

13. The method of claim 8, wherein the subset of network domains included in the whitelist are selected using a statistical classifier.

14. A computer program product, the computer program product being embodied in a tangible non-transitory computer readable storage medium and comprising computer instructions for:
   receiving a set of network related event data, wherein the set of network related event data includes Domain Name System (DNS) related event data; data, comprises:
      determining a total number of events of the set of network related event data per second-level domain (SLD); and
      removing invalid top-level domains (TLDs) and invalid pointer (PTR) records from the total number of events per SLD to obtain the DNS related event data;
   receiving a set of network related threat data, wherein the set of network related threat data includes DNS related threat data, and wherein the DNS related threat data includes a DNS threat feed that is automatically filtered to determine a popularity of network domains associated with malware;
   generating a whitelist using the set of network related event data and the set of network related threat data for policy enforcement based on a configured security policy for an enterprise network, wherein the whitelist includes a subset of network domains included in the DNS related event data based on a data driven model of the DNS related event data and the DNS related threat data, wherein the generating of the whitelist comprises:
      determining the top N domains based on the set of network related event data; and
      filtering, using a threshold, the top N domains to obtain the whitelist, wherein the threshold relates to a number of top domains or popularity over a period of time, wherein the threshold is static or dynamically derived via a machine learning technique, wherein the threshold is updated based on input from a Bayesian conditional probability model, and wherein the DNS related event data is automatically filtered using a classifier to exclude one or more network domains associated with malware, and wherein the filtering of the top N domains comprises:
         determining a rank of active threats in the top N domains; and
         outputting domains in the top N domains having an active threat to the whitelist;
   outputting the whitelist to a network device for filtering DNS requests using the whitelist; and
   identifying a network domain for further evaluation to determine whether the network domain is properly included on a blacklist.

15. The computer program product recited in claim 14, wherein the DNS related event data includes a set of popular network domains.

16. The computer program product recited in claim 14, wherein the DNS related threat data includes a DNS threat feed.

17. The computer program product recited in claim 14, wherein the DNS related threat data includes a DNS threat feed that is associated with a first enterprise network.

18. The computer program product recited in claim 14, wherein the subset of network domains included in the whitelist are selected using a classifier.

* * * * *